United States Patent [19]

Gazzoni

[11] Patent Number: 5,267,690
[45] Date of Patent: Dec. 7, 1993

[54] DEVICE FOR THE PULSATING DELIVERY OF AN IRRIGATION LIQUID, AND IRRIGATION SYSTEMS WHICH INCORPORATE THE DEVICE

[75] Inventor: Adamo Gazzoni, Cesena, Italy

[73] Assignee: Enichem Agricoltura S.p.A., Palermo, Italy

[21] Appl. No.: 962,459

[22] Filed: Oct. 16, 1992

[30] Foreign Application Priority Data

Oct. 17, 1991 [IT] Italy .................... MI91 A 002742

[51] Int. Cl.$^5$ .................................................. B05B 12/06
[52] U.S. Cl. ................................... 239/99; 239/101; 239/269; 137/624.14
[58] Field of Search .................... 239/76, 99, 101, 269; 137/624.14, 115

[56] References Cited

U.S. PATENT DOCUMENTS

| 4,176,791 | 12/1979 | Cattaneo et al. ............... 239/76 |
| 4,246,921 | 1/1981 | Beccaria et al. ........ 137/624.14 X |
| 4,781,217 | 11/1988 | Rosenberg ............... 137/624.14 |
| 4,900,189 | 2/1990 | Barosso et al. ......... 137/624.14 X |

FOREIGN PATENT DOCUMENTS

| 0191716 | 8/1986 | European Pat. Off. . |
| 1036305 | 8/1983 | U.S.S.R. ........................ 239/76 |
| 2048435 | 4/1980 | United Kingdom . |

*Primary Examiner*—Andres Kashnikow
*Assistant Examiner*—Lesley D. Morris
*Attorney, Agent, or Firm*—George P. Hoare, Jr.

[57] ABSTRACT

A device for the automatic pulsating delivery of an irrigation liquid is described, connectable upstream to the liquid source of constant or substantially constant pressure and downstream to an open-circuit distribution network provided with pressure-sensitive secondary valves which in response to pressure change open or close to enable the irrigation liquid to emerge. An irrigation system is also described in which said device is connected to a distribution network comprising a plurality of valves sensitive to pressure change and each provided with a delivery nozzle.

7 Claims, 5 Drawing Sheets

DEVICE FOR THE PULSATING DELIVERY OF AN IRRIGATION LIQUID, AND IRRIGATION SYSTEMS WHICH INCORPORATE THE DEVICE

BACKGROUND OF THE INVENTION

This invention relates to a device for the pulsating delivery of an irrigation liquid, and irrigation systems which incorporate the device.

The patents GB 1,286,538, GB 1,484,588, U.S. Pat. No. 3,698,195 and U.S. Pat. No. 4,009,832 describe localized open-circuit irrigation systems, widely used in agriculture, comprising a pipe directly connected to a feed source (hydraulic pump, pressurized water circuit etc.), from which hoses and secondary pipes of smaller dimensions extend at more or less regular intervals to disperse the liquid over the ground.

These secondary pipes or hoses are themselves variously structured to distribute the liquid as uniformly as possible, even at the points furthest from the source. All comprise pressure release means to cause the liquid to emerge in small quantities (droplets).

With these open circuit systems it is however difficult to achieve uniform irrigation at all points of the ground. U.S. Pat. No. 4,176,791 describes an irrigation system comprising a pilot valve connected upstream to a pressurized liquid source and from which a succession of pipe sections extends, these being connected together in series by secondary valves provided with a spray nozzle.

The succession of pipe sections starts from the valve and returns to it to form a closed ring.

Although this irrigation system improves the uniformity of liquid distribution over the ground compared with open systems, it is complicated by the use of a double pipe, i.e. an outward pipe and a return pipe to the pilot valve.

In addition, in a closed circuit it is difficult to expel the air which accumulates in the circuit with time and disturbs the correct operation of the valves.

Again, U.S. Pat. No. 4,900,189 in the name of the present applicant describes a device for automatic pulsating delivery of an irrigation liquid connected downstream to a distribution network provided with valves sensitive to the pressure variations produced by a venturi device which transmits them to a sliding member. Said device is complicated by the presence of two counter-pressure membranes, one interposed between said sliding member and the source liquid feed orifice and the other interposed between said sliding member and the bleed orifice to atmosphere. It is the mechanical sliding of the piston and the extreme elasticity of the membranes which enable the valves included in the distribution network to open and close so that the liquid can escape and irrigate the ground.

Even though the system is theoretically usable, its lack of practical usability means that it has been almost completely abandoned.

SUMMARY OF THE INVENTION

To overcome the drawbacks of the known art, the applicant has now found a device for the automatic pulsating delivery of an irrigation liquid which is applicable to an open circuit delivery system and is able to achieve uniform liquid distribution at almost any distance from the source.

The present invention therefore provides a device for the automatic pulsating delivery of an irrigation liquid connectable upstream to a liquid source of constant or substantially constant pressure and downstream to an open-circuit distribution network provided with pressure-sensitive secondary valves arranged to close during the network filling stage when the pressure equals or substantially equals the feed pressure, and to open during the irrigation liquid expulsion stage when the pressure falls below this value; in this manner, based on the amount of this falling pressure, a sliding member is made to move reciprocatingly between a position in which the irrigation liquid feed orifice is open and a position in which this orifice is closed and simultaneous or subsequent bleeding to atmosphere takes place, with expulsion of irrigation liquid from the network and recommencement of the cycle.

The present invention further provides the irrigation system in which said device is connected to a distribution network comprising a plurality of pressure-sensitive valves provided with a delivery nozzle.

In said device, shown in longitudinal section in FIG. 1, the reference numeral 1 indicates the support block provided with connectors 2 and 3, for feeding the liquid maintained at virtually constant pressure P0 by a suitable regulator not shown, and for the exit of the liquid to be fed to the spray nozzles respectively; 4 indicates the body of a flow regulator valve provided with a screw 5 having a conical end and defining with its equally conical seat a passage of variable dimensions for regulating the entry cross-section for the liquid into the valve; 6 indicates the duct through which the liquid is fed to the valve, which controls the intermittent exit of jets from the spray nozzles; 7 indicates the hollow valve body provided internally with a port 8 forming the sealing seat for the valving member 9 via its frontal gasket 10; 11 indicates an annular gasket on the valving member which together with that part of the cavity in the body 7 at the same end as the port 8 defines the chamber C1; 12 indicates a connector through which liquid leaves the pilot valve; 13 indicates a spring interposed between the valving member and the preload adjustment screw 14.

BRIEF DESCRIPTION OF THE DRAWINGS

The invention is described hereinafter with reference to the accompanying drawings, in which.

DETAILED DESCRIPTION OF THE INVENTION

Figure 1:
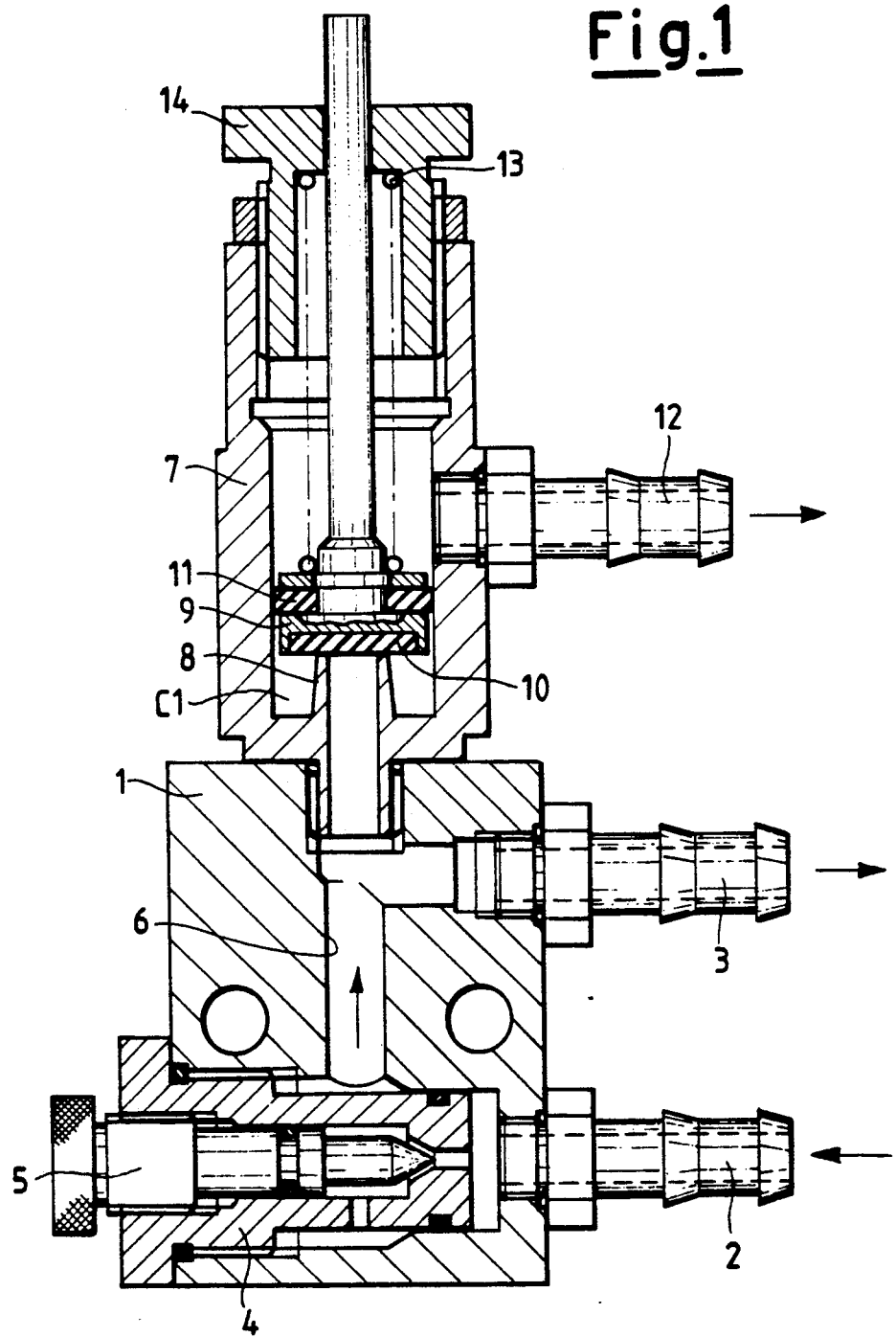
FIG. 1 is a vertical section through one embodiment of the device for the automatic pulsating delivery of an irrigation liquid.

With reference to FIG. 1, the irrigation liquid originating from the line at pressure P0 passes through the connector 2 to reach the valve 4, which regulates its flow rate by means of the screw. While the valving member 9 is maintained in its closure position by the spring 13, the liquid feeds the irrigation line by passing through the connector 3. The pressure P1 in said line gradually increases until it reaches the set value at which the thrust of the liquid on the valving member 9 equals the preload force of the spring. In this state of equilibrium of the valving member the line pressure P1 is still less than the feed pressure P0, so that further increase in the pressure P1 causes the valving member to open, initially gradually, to give rise to a pressure P1 in the chamber C1. By the effect of said pressure and the increase in the thrust section on the valving member 9, the valving member moves suddenly away from the liquid entry port 8, to cause that section of line from the device to the closest secondary irrigation valve to rapidly reach atmospheric pressure (because of the escape of liquid through the connector 12). Liquid delivery proceeds until the pressure within the valve is such as to exert on the valving member a thrust greater than that exerted by the spring.

The total mass of liquid delivered during this stage through the connector 12 and the secondary valves is equal to that which has to be again fed to return the device to the valving member opening pressure. The valving member closes onto the port 8 and the cycle is repeated.

Adjusting the screw 14 varies the pressure at which the valving member 9 snaps open and hence the frequency of the jets, the liquid discharge rate through the secondary valves and the liquid mass discharged at each snap opening. Adjusting the screw 5 adjusts the liquid flow rate into the device, with consequent variation only of the frequency of the jets.

The device of FIG. 1 hence recommences a new pressure pulsation cycle.

It is apparent that, since also the network downstream of the connector 3 is full with liquid, the volume delivered by the secondary valve of the network is equivalent to the volume generated by the elastic expansion of the network itself which, upon every delivery, is returned to its rest position.

The second aspect of the present invention relates to irrigation systems incorporating the device for the automatic pulsating delivery of the irrigation liquid.

Figure 2:
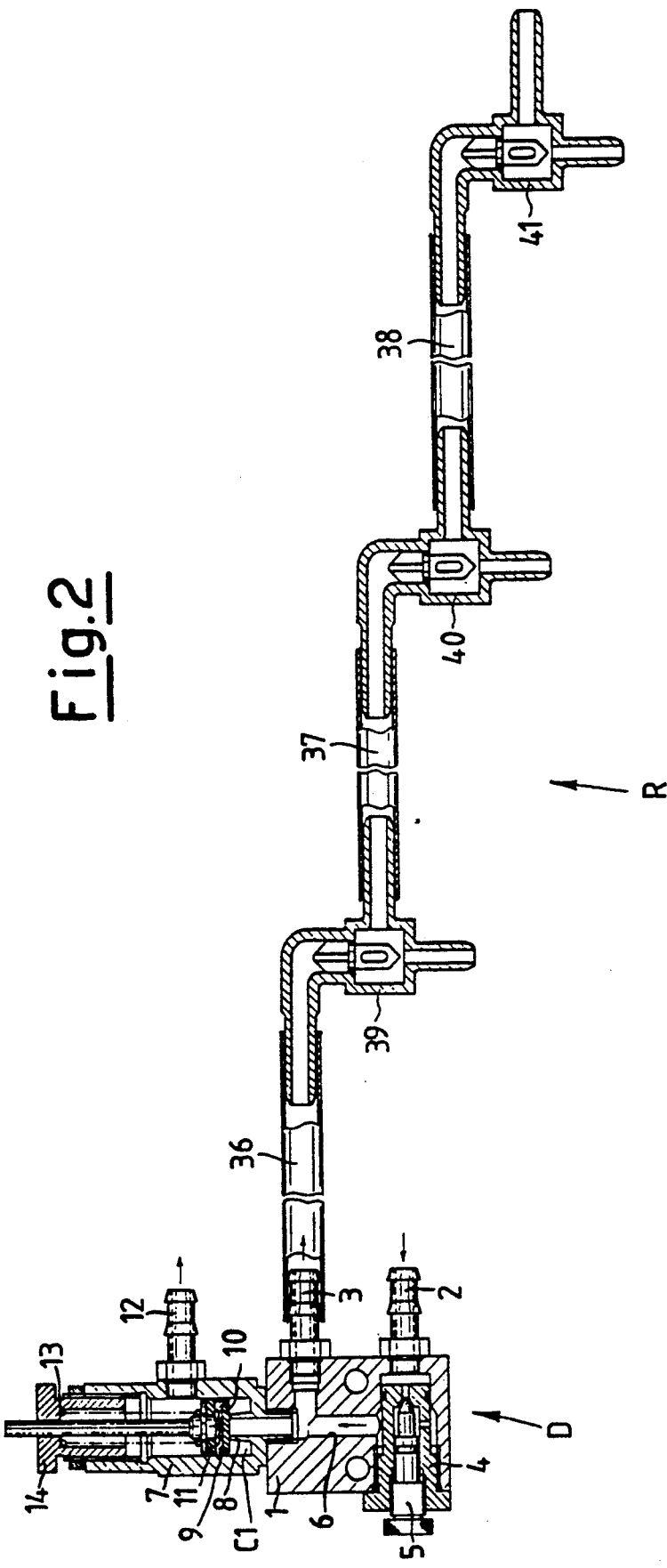
FIG. 2 is a vertical section through an irrigation system in which the device of FIG. 1 is connected to a liquid distribution network provided with pressure-sensitive secondary valves.

In such systems said device is connected to one end of a delivery network comprising a plurality of pressure-sensitive secondary valves provided with delivery nozzles. With reference to FIG. 2, the device for the automatic pulsating delivery of irrigation liquid is indicated overall by D and the distribution network for said liquid by R.

This network consists of a succession of pipe sections each provided at its downstream end with a secondary valve fitted with a delivery nozzle.

FIG. 2 shows for simplicity only three of these sections, indicated by the reference numerals 36, 37 and 38, the relative valves being indicated by the reference numerals 39, 40 and 41. In a preferred embodiment the secondary valves connected to the network have the configuration shown in FIGS. 3 and 4. Specifically, in these figures it can be seen that the valve consists of a body 42 comprising the entry channel 43, the exit channel 44 and the delivery nozzle 45.

Inside the valve there is a piston 46 provided with a seal disc 51 to which the valving member 48 is connected. This latter consists of two columns 49 and 50 of flexible plastic material, and when the piston 46 slides in its cylindrical guide 47 it closes the seat 52 on the delivery nozzle 45 or closes the entry channel 43, depending on the pressure in the channels 43 and 44.

During the filling stage the described pulsating device fills the distribution network until the network pressure reaches a value equal or close to the source pressure.

Figure 3:
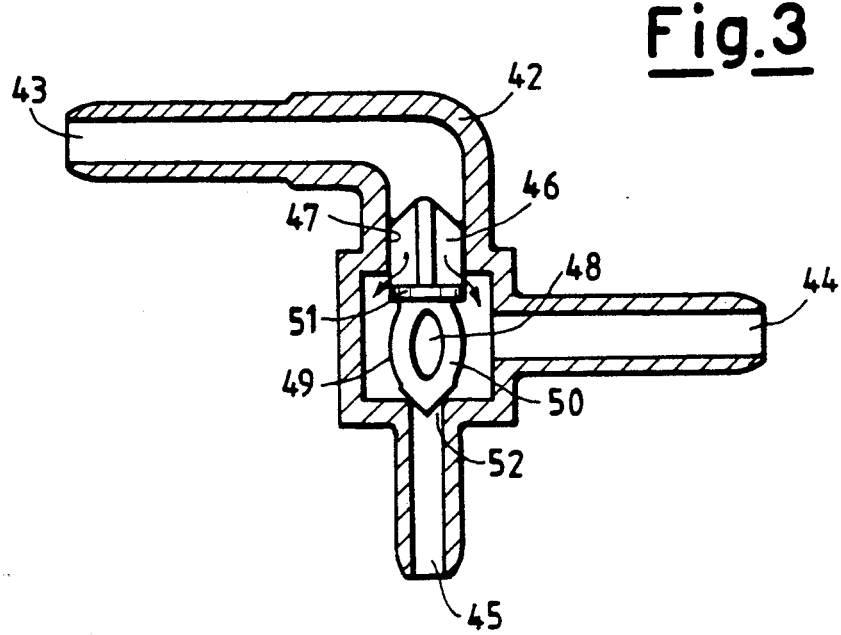
FIGS. 3 and 4 are vertical sections through particular embodiments of the secondary valves usable in the distribution network of the irrigation system of FIG. 2.
Figure 4:
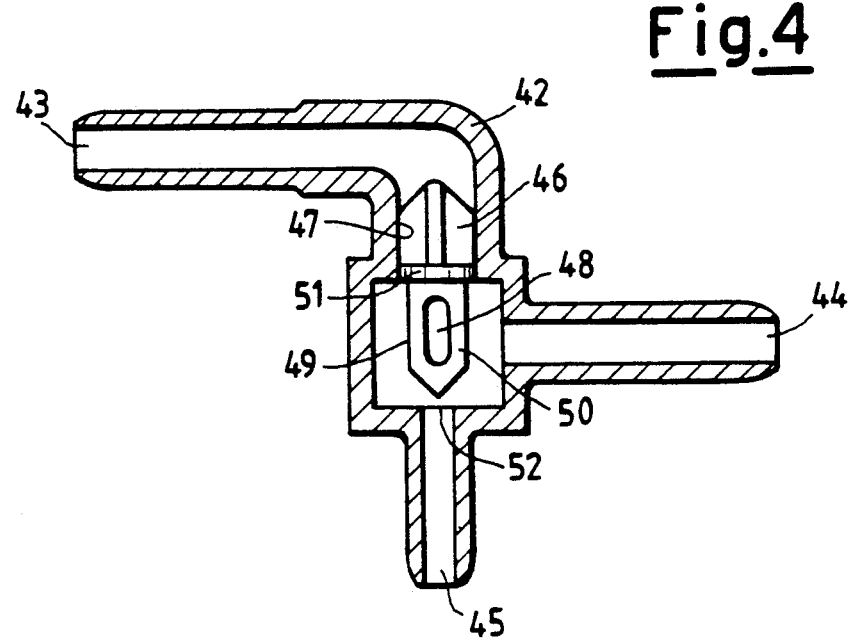

In this respect, with reference to FIGS. 2, 3 and 4, during the filling stage the liquid passes under the effect of the source pressure through the pulsating distributor D and the section 36 of the network R to reach the secondary valve 39. Within this valve the liquid presses against the piston 46, which itself urges the valving member 48 against the seat 52 to close it.

The liquid feed pressure also lowers the seal disc 51. This is facilitated by the flexibility of the plastic material with which the columns 49 and 50 of the valving member 48 are constructed. The lowering of the seal disc 51 opens a passage between the entry channel 43 and the exit channel 44 to hence fill the section 37 of the network R as far as the valve 40. This filling then continues until the entire network is filled.

When the network filling is complete, the liquid flow stops, and the feed pressure acts on the valving member 9 to raise it until it reaches the connector 12, so opening the bleed to atmosphere with consequent fall in the pressure.

This fall in pressure is transmitted firstly to the section 36 of the network R, the effect of the difference in pressure between the network section 37 (at a pressure equal or approximately equal to the source pressure) and the section 36 (at atmospheric or approximately atmospheric pressure) causing the piston 46 of the valve 39 to move upwards into the seat 47, dragging with it the valving member 48 which hence releases the seat 52 with consequent escape of irrigation liquid from the nozzle 45.

This escape of liquid from the section 37 continues until the pressure in said network section 37 reaches atmospheric or approximately atmospheric pressure.

The phenomenon is repeated for the various subsequent sections of the network R until the last network section.

The time for which the secondary valves open is measurable in terms of fractions of a second.

The refilling of the network R by the pulsating device D begins from the moment at which the pressure in the network section 36 has fallen to atmospheric or approximately atmospheric.

The time for refilling the network is greater than the emptying time and can vary from a few seconds to some tens of seconds depending on the size of the irrigation system, the irrigation liquid flow rate through the valve 4 and 5 from the source, and the pressure exerted on the spring 13 by the screw 14.

The energy which enables the individual network sections to discharge the irrigation liquid by virtue of the available pressure is provided by the elasticity of the network, which is usually of plastic construction.

In the case of a poorly elastic network (for example of steel), each network section can be provided with a suitable elastic expansion chamber of dimensions chosen on the basis of the quantity of irrigation liquid to be delivered at each cycle. The particular form of the pulsating device D and its type of automatic operation which makes it largely independent of the type of network connected downstream results in simple and effective irrigation control on the basis of contingent requirements and ground characteristics.

Figure 5:
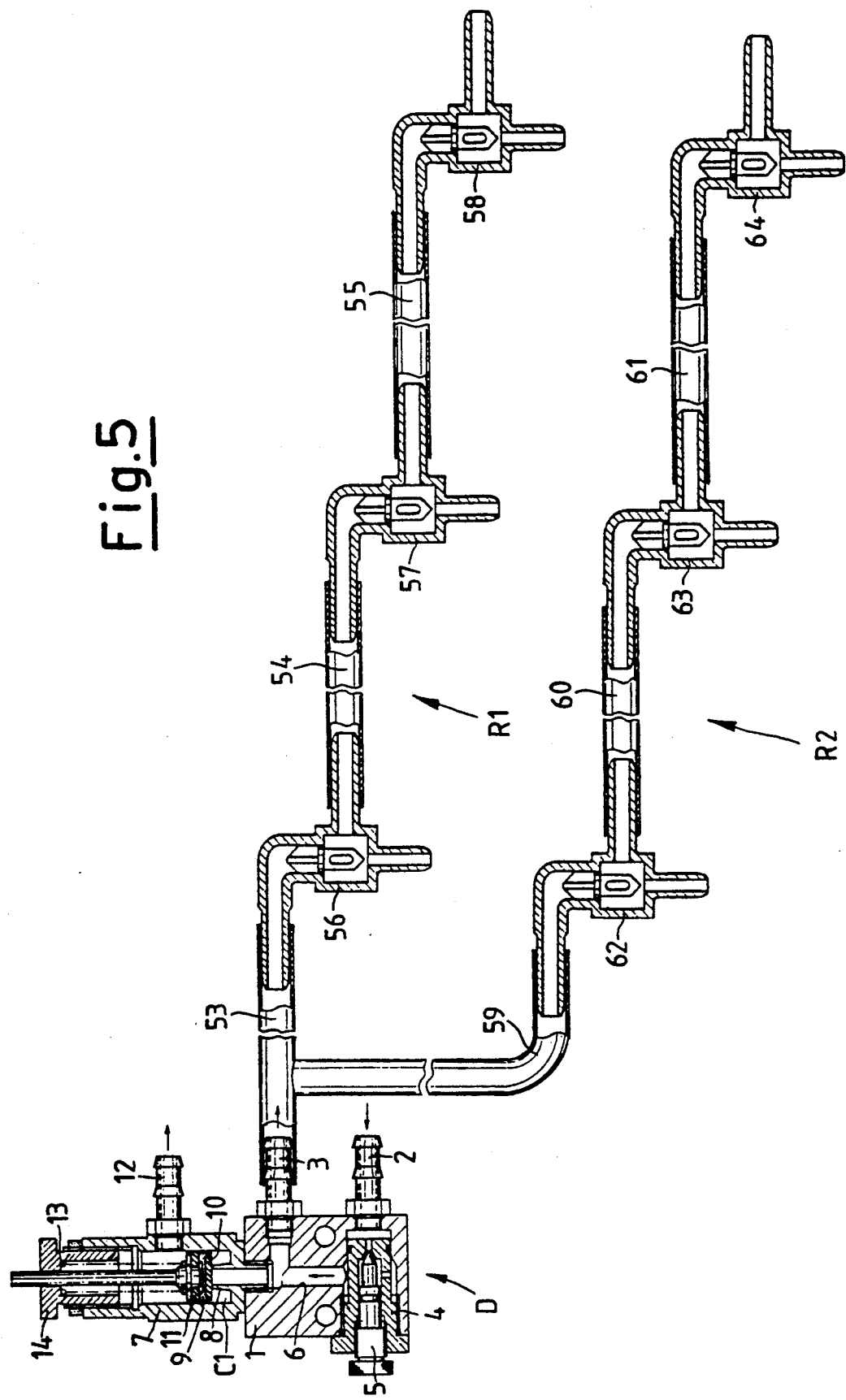
FIG. 5 is a vertical section through a particular embodiment of the irrigation system.

FIG. 5 shows an example of a branched distribution network. In this case downstream of the pulsating device D there are two distribution network branches, namely the branch R1 formed of the sections 53, 54 and 55 with valves 56, 57 and 58 interposed between said sections, and the branch R2 formed of the sections 59, 60 and 61 with respective valves 62, 63 and 64.

Figure 6:
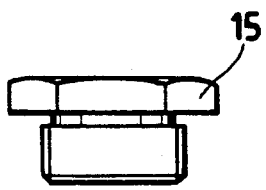
FIGS. 6 and 7 are vertical sections through a device alternative to the entry liquid regulator valve 4 and 5, in which the valve is replaced by a plug 15 and a special connector 16 is provided in place of the connector 2.
Figure 7:
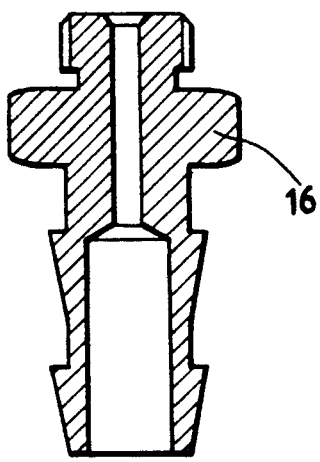

In yet another embodiment of the invention, the entry liquid regulator valve 4 and screw 5, shown in FIG. 1, can be replaced with a plug 15, as shown in FIG. 6. The connector 2 can be replaced by a special connector 16, as shown in FIG. 7. The operation of the device is otherwise the same as that described above.

I claim:

1. A device for automatic pulsating delivery of an irrigation liquid connectable upstream to a liquid source of constant or substantially constant pressure and downstream to an open-circuit distribution network provided with pressure-sensitive secondary valves arranged to close during a network filling stage when the pressure on the secondary valves equals or substantially equals feed pressure of the liquid source, and to open during an irrigation liquid expulsion stage when the pressure on the secondary valves falls below the feed pressure; said device comprising:
   a hollow bodied valve with a valve seat wherein a chamber is formed by an outer wall of said hollow bodied valve and the valve seat;
   a piston-type sliding valving member housed by said hollow bodied valve which exposes a first face of said sliding valving member to feed pressure of the irrigation liquid flowing through a liquid entry duct of said hollow bodied valve;
   a support block about said irrigation entry liquid duct of said hollow bodied valve;
   a liquid entry connector for attachment to said liquid source coupled to said support block;
   a flow regulator valve for adjusting the liquid entry of the irrigation liquid through said liquid entry connector from the liquid source, said regulating valve housed in said support block;
   a preloading device for exerting force on a second face of said sliding valving member;
   a connector with a bleed hole to atmosphere coupled to an irrigation liquid exit duct located at a top portion of said hollow bodied valve: and
   a feed connector from said support block for an irrigation liquid open-circuit distribution network.

2. A device for automatic pulsating delivery of an irrigation liquid as claimed in claim 1 further comprising:
   a primary liquid circuit formed in said hollow bodied valve starting from said irrigation liquid entry duct and ending with said irrigation liquid exit duct, said sliding valving member functioning to close said valve seat which acts as an orifice between the entry and exit ducts;
   a connecting duct in said support block connecting said flow regulator valve to the entry duct of said hollow bodied valve; wherein said sliding valving member is moved to an upper position initially by the liquid passing from said connecting duct to said liquid entry duct of said hollow bodied valve and then by the thrust of the liquid in said hollow bodied valve chamber so that said sliding valving member moves between a lower position within said hollow bodied valve in which said sliding valving member shuts off communication between the bleed hole and said entry duct by closing said valve seat orifice and an upper position in which said sliding valving member opens communication between said bleed hole and said entry duct by opening said valve seat orifice.

3. A device for automatic pulsating delivery of an irrigation liquid as claimed in claim 1 or 2, wherein said regulator valve is a plug.

4. An irrigation system, comprising:
   a device for automatic pulsating delivery of an irrigation liquid connectable upstream to a liquid source of constant or substantially constant pressure and downstream to an oper-circuit distribution network provided with pressure-sensitive secondary valves arranged to close during a network filling stage when the pressure equals or substantially equals feed pressure of the liquid source, and to open during an irrigation liquid expulsion stage when the pressure on the secondary valves falls below the feed pressure; said device comprising:
   a hollow bodied valve with a valve seat wherein a chamber is formed by an outer wall of said hollow bodies valve and said valve seat;
   a piston-type sliding valving member housed by said hollow bodied valve which exposes a first face of said sliding valving member to feed pressure of the irrigation liquid flowing through a liquid entry duct of said hollow bodied valve;
   a support block about said irrigation liquid entry duct of said hollow bodied valve;
   a liquid entry connector for attachment to said liquid source coupled to said support block;
   a flow regulator valve for adjusting the liquid entry of the irrigation liquid through said liquid entry connector from the liquid source, said regulating valve housed in said support block;
   a preloading device for exerting force on a second face of said sliding valving member;
   a connector with a bleed hole to atmosphere coupled to an irrigation liquid exit duct located at a top portion of said hollow bodied valve; and
   a feed connector from said support block for an irrigation liquid open-circuit distribution network, said network, connected downstream from said device, comprising a plurality of pressure-sensitive secondary valves, each secondary valve provided with a delivery nozzle.

5. An irrigation system as claimed in claim 4, wherein said secondary valves of the distribution network comprise a valve body comprising an entry channel, an exit channel and a spray nozzle, said valve body containing a piston connected to a member via a seal disc, said member consisting essentially of two connected columns of flexible plastic material.

6. A device for automatic delivery of an irrigation liquid as claimed in claim 4 further comprising:
   a primary liquid circuit formed in said hollow bodied valve starting from said irrigation liquid entry duct and ending with said irrigation liquid exit duct, said sliding valving member functioning to close said valve seat which acts as an orifice between the entry and exit ducts;
   a connecting duct in said support block connecting said flow regulator valve to the entry duct of said hollow bodied valve; wherein said sliding valving member is moved to an upper position initially by the liquid passing from said connecting duct to said liquid entry duct of said hollow bodied valve and then by the thrust of the liquid in said hollow bodied valve chamber so that said sliding valving member moves between a lower position within said hollow bodied valve in which said sliding valving member shuts off communication between the bleed hole and said entry duct by closing said valve seat orifice and an upper position in which said sliding valving member opens communication between said bleed hole and said entry duct by opening said valve seat orifice.

7. An irrigation system as claimed in claim 6, wherein said secondary valves of the distribution network comprise a valve body comprising an entry channel, an exit channel, and a spray nozzle, said valve body containing a piston connected to a member via a seal disc, said member consisting essentially of two connected columns of flexible plastic material.

* * * * *